UNITED STATES PATENT OFFICE.

LEO H. BAEKELAND, OF YONKERS, NEW YORK, ASSIGNOR TO GENERAL BAKELITE COMPANY, OF NEW YORK, N. Y., A CORPORATION OF NEW YORK.

INFUSIBLE CONDENSATION PRODUCT.

1,088,678. Specification of Letters Patent. Patented Mar. 3, 1914.

No Drawing. Original application filed March 14, 1910, Serial No. 549,100. Divided and this application filed May 9, 1911. Serial No. 626,016.

*To all whom it may concern:*

Be it known that I, LEO H. BAEKELAND, a citizen of the United States, residing at Yonkers, in the county of Westchester and State of New York, have invented certain new and useful Improvements in Infusible Condensation Products, of which the following is a specification.

It is known that phenol or oxybenzol ($C_6H_5OH$) or its homologues may, under certain special conditions, react upon formaldehyde, (or the polymers of formaldehyde, or products engendering formaldehyde) with chemical elimination of water, or so-called chemical condensation, to yield insoluble infusible condensation products. The utilization of this reaction for industrial purposes forms the subject-matter of my U. S. Patents Nos. 942,699; 942,700; 942,852; 942,808; 942,809; 939,966; 941,605 and 949,671.

In studying the relative behavior of the homologues of phenols as encountered in phenol mixtures extracted from coal tar, I find that there is a considerable difference in the action of oxybenzol, orthocresol, paracresol and metacresol. With metacresol the action on formaldehyde is very rapid and energetic, requires relatively small amounts of condensing agents, and gives products of maximum hardness and chemical and physical resistance; oxybenzol acts more slowly and less satisfactorily, while ortho- and paracresol are considerably slower in reacting, require more formaldehyde, stronger condensing agents, or more condensing agent, do not furnish the very hardest bodies, and are more inclined to produce fusible soluble condensation products, which are not desired in processes which aim at the production of hard, strong, resisting, infusible and insoluble products, instead of so-called soluble, fusible shellac substitutes. I thus find that if instead of using for this purpose ordinary commercial mixtures of phenolic bodies as obtained from coal tar, which contain besides metacresol, variable quantities of oxybenzol ($C_6H_5OH$), orthocresol, paracresol, xylenols, hydrocarbons and other impurities, I submit this mixture to any process which tends to increase its content of metacresol, and to eliminate substances other than metacresol or oxybenzol ($C_6H_5OH$), I obtain much better results. The results are still better if, for this purpose, I employ reasonably pure metacresol, or a mixture of metacresol

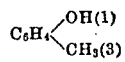

and oxybenzol $C_6H_5OH$, or a mixture of metacresol and paracresol where the paracresol is present in substantial quantity, but the metacresol in the preponderating proportion, which mixtures can easily be separated by frictional distillation from commercial mixtures.

In my process, I can use instead of formaldehyde, any of the equivalents of formaldehyde, as for instance its polymers or such substances as are capable of engendering formaldehyde.

The process can be carried out in one or several stages as described in my prior patents and other publications (see Baekeland, *Journal Ind. Eng. Chem.* March number 1909, page 149; August number, 1909, page 545). The condensing process or synthesis may be carried out inside of porous bodies, or suitable fillers may be incorporated with the reacting materials at any stage of the process as described in said prior patents and publications. The process may be facilitated by acid or basic condensing agents and the use of heat or heat and pressure.

In order to increase the amount of metacresol in a commercial mixture of phenols as obtained from the distillation of coal tar, I can submit same to fractional distillation whereby oxybenzol and orthocresol will distil first and from this mixture the orthocresol can be separated by fractional freezing, oxybenzol crystallizing first. The latter can then be added again to the higher boiling fractions which contain mainly metacresol with a smaller amount of paracresol, so that after a proper mixture is made it is found that the percentage of orthocresol has been considerably decreased in the new mixture and the percentage of metacresol has been considerably increased together with that of oxybenzol. Or the whole lighter fraction containing oxybenzol and orthocresol can be rejected and the higher boiling portion containing mostly metacresol with smaller amounts of paracresol used for reacting upon formaldehyde.

Instead of increasing the percentage of metacresol, or of metacresol and oxybenzol, by fractional distillation as above described, other suitable methods whereby the same results may be accomplished may be used. For example I may use the method based upon the differing solubility of the barium salts, (German Patent 53307 to Riehm); that based upon treatment with chloracetic acid (German Patent 79514 to Lederer); or those of German Patent 100418 to Byck, based on special treatment of different salts; German Patent 112545 to Raschig, separation of the sulfonic derivatives; German Patent 114975 to Raschig, treatment of the sulfonic acids by superheated steam; German Patent 137584 and 141421 to Rutgers, separation by means of oxalic acid; German Patent 148703 to Ladenburg, treatment with sodium bisulfate containing pyrosulfate; German Patent 152652 to Ladenburg, utilization of lesser solubility of metacresolate of calcium; German Patent 156761 and 157616 to Gentsch, use of potash; etc., etc.

This application is a division of my prior application Ser. No. 549,100, filed March 14, 1910.

I claim:—

1. An insoluble and infusible body, containing as essential constituents the condensation products of formaldehyde and metacresol, and of formaldehyde and paracresol, the former in preponderating proportion.

2. An insoluble and infusible body, containing as essential constituents the condensation products of formaldehyde and metacresol, and of formaldehyde and paracresol, the former in preponderating proportion, compounded with a filling material.

3. An insoluble and infusible body, containing as essential constituents the condensation products of formaldehyde and metacresol, paracresol and oxybenzol, the condensation products of metacresol and oxybenzol being in preponderating proportion.

4. An insoluble and infusible body, containing as essential constituents the condensation products of formaldehyde and metacresol, paracresol and oxybenzol, said mixture compounded with a filling material, the condensation products of metacresol and oxybenzol being in preponderating proportion.

In testimony whereof, I affix my signature in presence of two witnesses.

LEO H. BAEKELAND.

Witnesses:
WM. S. GORDON, Jr.,
CARL DITTMAR.